US010093000B2

(12) United States Patent
Donaldson et al.

(10) Patent No.: US 10,093,000 B2
(45) Date of Patent: Oct. 9, 2018

(54) SOCKET FUSION JIG

(71) Applicant: McElroy Manufacturing, Inc., Tulsa, OK (US)

(72) Inventors: Paul John Donaldson, Broken Arrow, OK (US); Gregory C. Meadows, Disney, OK (US)

(73) Assignee: McElroy Manufacturing, Inc., Tulsa, OK (US)

( * ) Notice: Subject to any disclaimer, the term of this patent is extended or adjusted under 35 U.S.C. 154(b) by 1248 days.

(21) Appl. No.: 13/886,975

(22) Filed: May 3, 2013

(65) Prior Publication Data

US 2014/0033491 A1 Feb. 6, 2014

Related U.S. Application Data

(60) Provisional application No. 61/680,173, filed on Aug. 6, 2012.

(51) Int. Cl.
| | |
|---|---|
| *B25B 11/02* | (2006.01) |
| *B25B 27/10* | (2006.01) |
| *B25B 5/00* | (2006.01) |
| *B25B 5/14* | (2006.01) |

(52) U.S. Cl.
CPC .............. *B25B 11/02* (2013.01); *B25B 5/003* (2013.01); *B25B 5/147* (2013.01); *B25B 27/10* (2013.01); *Y10T 29/5367* (2015.01)

(58) Field of Classification Search
CPC ......... B25B 11/02; B25B 27/10; B25B 5/003; B25B 5/147; Y10T 29/5367

USPC ............................................................ 269/32
See application file for complete search history.

(56) References Cited

U.S. PATENT DOCUMENTS

| | | | | |
|---|---|---|---|---|
| 889,315 | A * | 6/1908 | Kenyon | B25B 27/023 254/29 R |
| 1,417,969 | A * | 5/1922 | Burstall | B25B 13/52 81/69 |
| 3,364,555 | A * | 1/1968 | Swink | F16L 1/09 29/237 |
| 3,653,115 | A * | 4/1972 | Perkins | F16L 1/09 254/29 R |
| 3,710,427 | A * | 1/1973 | Doty | F16L 1/09 29/237 |
| 3,831,256 | A * | 8/1974 | Bjalme | B29C 65/7802 29/237 |

(Continued)

FOREIGN PATENT DOCUMENTS

| | | |
|---|---|---|
| CN | 86205524 U | 9/1987 |
| CN | 2133411 Y | 5/1993 |

(Continued)

OTHER PUBLICATIONS

Images of fusion equipment (undated but admitted to be prior art).

(Continued)

*Primary Examiner* — Marc Carlson
(74) *Attorney, Agent, or Firm* — McAfee & Taft

(57) ABSTRACT

A socket fusion jig includes a pipe saddle and coupling saddle spaced apart. Rotation of a handle causes the pipe saddle and coupling saddle to move laterally relative to one another so that the pipe held in the pipe saddle may be fused to the coupling held in the coupling saddle.

8 Claims, 11 Drawing Sheets

(56) References Cited

U.S. PATENT DOCUMENTS

| | | | | |
|---|---|---|---|---|
| 4,054,984 A * | 10/1977 | Ball | ......... | B25B 27/10 |
| | | | | 269/43 |
| 4,170,345 A | 10/1979 | Townsend | | |
| 4,257,135 A * | 3/1981 | Moebius | ......... | B25B 7/06 |
| | | | | 29/237 |
| 4,356,615 A * | 11/1982 | Dearman | ......... | B23K 37/0533 |
| | | | | 228/49.3 |
| 4,428,893 A * | 1/1984 | Cummings, Jr. | ..... | B01F 3/0412 |
| | | | | 248/74.3 |
| 4,492,015 A * | 1/1985 | Dearman | ......... | B23K 9/0286 |
| | | | | 269/43 |
| 4,542,892 A * | 9/1985 | Goldner | ......... | B29C 65/20 |
| | | | | 269/127 |
| 4,722,468 A * | 2/1988 | McClure | ......... | B23K 37/0533 |
| | | | | 228/49.3 |
| 4,726,575 A * | 2/1988 | Dearman | ......... | B23K 37/0533 |
| | | | | 269/131 |
| 4,769,889 A * | 9/1988 | Landman | ......... | B25B 27/10 |
| | | | | 269/43 |
| 4,872,709 A * | 10/1989 | Stack | ......... | B25B 7/02 |
| | | | | 285/39 |
| 4,893,393 A * | 1/1990 | Marshall | ......... | B25B 27/10 |
| | | | | 269/43 |
| 5,129,636 A * | 7/1992 | Bridgstock | ......... | B29C 65/7802 |
| | | | | 269/24 |
| 5,226,231 A * | 7/1993 | De Leebeeck | ......... | B25B 27/10 |
| | | | | 29/237 |
| 5,513,425 A * | 5/1996 | Williams | ......... | B25B 27/10 |
| | | | | 29/237 |
| 5,632,089 A * | 5/1997 | Sakamoto | ......... | B23D 49/002 |
| | | | | 30/372 |
| 5,640,748 A * | 6/1997 | Harrison | ......... | B25B 27/10 |
| | | | | 254/29 R |
| 5,848,770 A * | 12/1998 | Oliver | ......... | E21F 17/02 |
| | | | | 248/58 |
| 6,016,592 A | 1/2000 | Lavender | | |
| 6,142,165 A * | 11/2000 | Wartel | ......... | F16L 41/06 |
| | | | | 137/15.08 |
| 6,212,747 B1 | 4/2001 | Porter et al. | | |
| 6,212,748 B1 | 4/2001 | Porter et al. | | |
| 6,239,412 B1 | 5/2001 | Thoman et al. | | |
| 6,672,545 B1 * | 1/2004 | Persing | ......... | F16L 3/1211 |
| | | | | 248/58 |
| 6,892,753 B2 * | 5/2005 | Robison | ......... | B23B 5/168 |
| | | | | 137/15.09 |
| 7,320,165 B1 * | 1/2008 | Hard | ......... | B25B 27/16 |
| | | | | 29/237 |
| 7,677,505 B2 * | 3/2010 | Deichman | ......... | F16L 3/1008 |
| | | | | 138/106 |
| 7,818,857 B1 * | 10/2010 | Viviano | ......... | B23P 19/02 |
| | | | | 29/237 |
| 8,191,211 B2 * | 6/2012 | Ignaczak | ......... | F16L 33/08 |
| | | | | 24/274 R |
| 8,266,776 B2 * | 9/2012 | Dwileski, Jr. | ...... | B23K 37/0533 |
| | | | | 228/212 |
| 8,328,071 B2 * | 12/2012 | LaValley | ......... | B26D 3/16 |
| | | | | 228/212 |
| 8,567,836 B2 * | 10/2013 | LaValley | ......... | E21B 19/155 |
| | | | | 294/198 |
| 8,763,960 B1 * | 7/2014 | Moore | ......... | F16L 3/133 |
| | | | | 174/40 R |
| 8,833,705 B2 * | 9/2014 | Bragagna | ......... | F16L 3/11 |
| | | | | 248/58 |
| 8,863,621 B2 * | 10/2014 | Richardson | ......... | E21B 19/164 |
| | | | | 81/57.11 |
| 8,950,648 B2 * | 2/2015 | Simmons | ......... | B23K 37/0533 |
| | | | | 219/159 |
| 9,073,732 B2 * | 7/2015 | LaValley | ......... | B66C 1/44 |
| 9,242,410 B2 * | 1/2016 | Lawrence | ......... | B29C 65/7841 |
| 9,506,586 B2 * | 11/2016 | Van Heerden | ......... | F16L 1/20 |
| 2001/0003225 A1 * | 6/2001 | Stephen | ......... | F16L 1/10 |
| | | | | 29/272 |
| 2005/0120539 A1 * | 6/2005 | Tutt | ......... | B25B 27/10 |
| | | | | 29/466 |
| 2009/0155040 A1 * | 6/2009 | Martin | ......... | B66C 1/427 |
| | | | | 414/744.8 |
| 2011/0089621 A1 | 4/2011 | Seidel | | |
| 2012/0213937 A1 * | 8/2012 | LaValley | ......... | B26D 3/16 |
| | | | | 427/401 |
| 2012/0246902 A1 * | 10/2012 | Montena | ......... | B25B 27/10 |
| | | | | 29/426.6 |
| 2013/0000834 A1 * | 1/2013 | D'Arco | ......... | B29C 65/3468 |
| | | | | 156/272.2 |
| 2013/0147102 A1 * | 6/2013 | Mann | ......... | F16L 23/003 |
| | | | | 269/40 |
| 2014/0033491 A1 * | 2/2014 | Donaldson | ......... | B25B 11/02 |
| | | | | 29/237 |
| 2014/0259597 A1 * | 9/2014 | Lavalley | ......... | B21D 19/10 |
| | | | | 29/407.1 |
| 2015/0258663 A1 * | 9/2015 | Donaldson | ......... | B29C 65/20 |
| | | | | 29/237 |

FOREIGN PATENT DOCUMENTS

| | | | | |
|---|---|---|---|---|
| CN | 2465864 Y | 12/2001 | | |
| CN | 201720785 U | 1/2011 | | |
| CN | 103596871 A | 2/2014 | | |
| DE | 202012100765 U1 | 6/2013 | | |
| GB | 1408608 A | * 10/1975 | ......... | B29C 65/2092 |
| JP | S57159420 U | 10/1982 | | |
| RU | 96117009 A | 11/1998 | | |
| RU | 84767 U1 | 7/2009 | | |
| SU | 967789 A1 | 10/1982 | | |
| SU | 1152716 A | 4/1985 | | |

OTHER PUBLICATIONS

Pages from McElroy Manufacturing, Inc., catalog, "The Toughest Fusion Machines in the World," (2010).

International Search Report and Written Opinion of the International Searching Authority dated Mar. 10, 2014, in counterpart PCT Application No. PCT/US2013/053432.

EP 13828425, PCT/US2014/045123, Broce Manufacturing Co., Inc., European Search Report dated Jan. 21, 2016.

AU 2013299891, PCT/US2014/045123, Broce Manufacturing Co., Inc., Australian Search Report No. 1 dated Nov. 13, 2015.

AU 2013299891, PCT/US2014/045123, Broce Manufacturing Co., Inc., Australian Search Report No. 2 dated Mar. 7, 2016.

Supplementary European Search Report dated Jan. 22, 2016, filed in counterpart European Patent Application 13828425.2.

International Search Report and Written Opinion dated Jul. 14, 2015, issued in related PCT Application No. PCT/US2015/021058.

European Search Report dated Oct. 27, 2017, in corresponding European Patent Application No. 15764592.0.

Office Action issued in corresponding Chinese Patent Application No. 201580026287.8 dated Nov. 3, 2017.

Examination Report No. 3 dated Nov. 16, 2017, in corresponding Australian Patent Application No. 2015231503.

Official Action dated Nov. 24, 2017, in corresponding Russian Patent Application 2016140479.

* cited by examiner

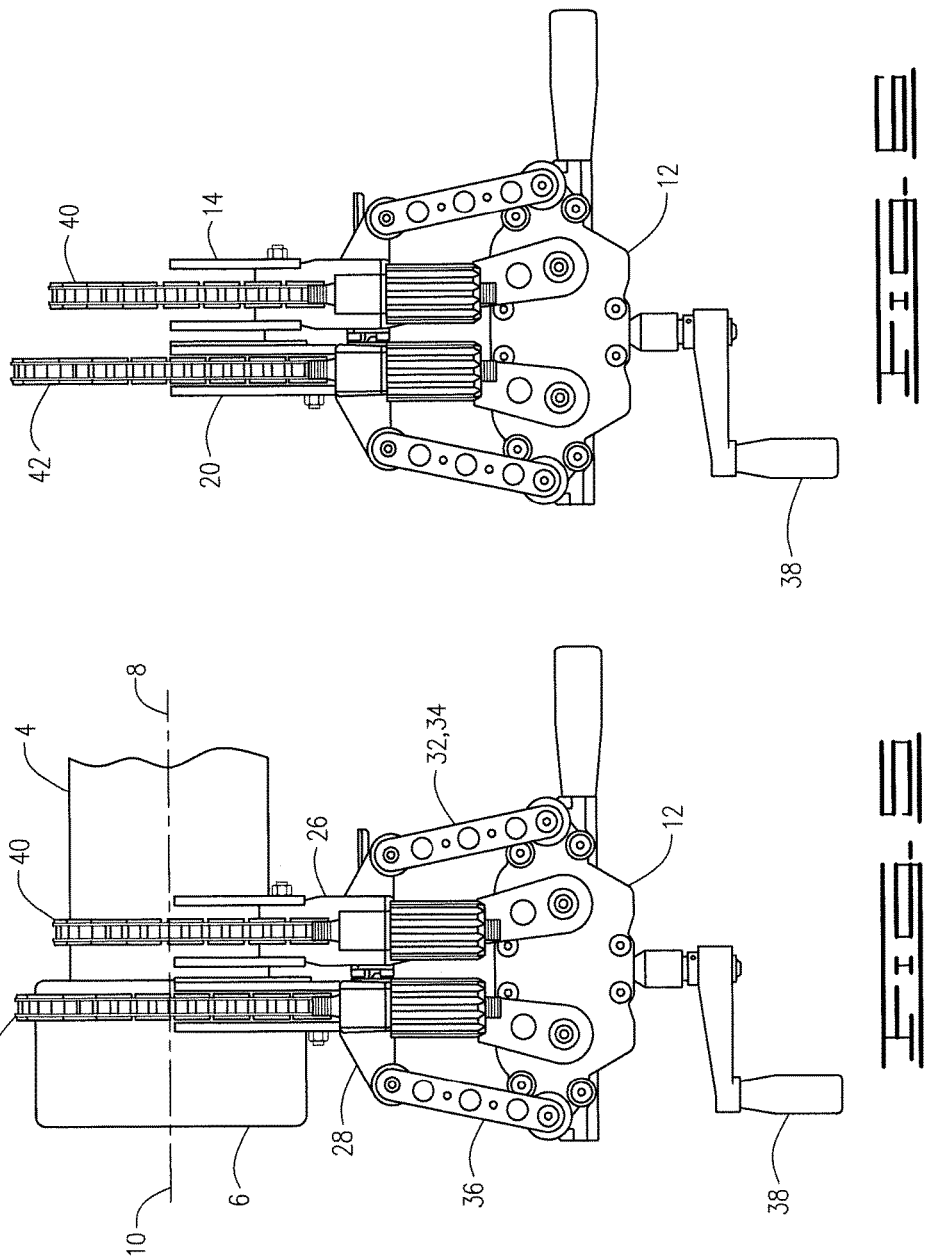

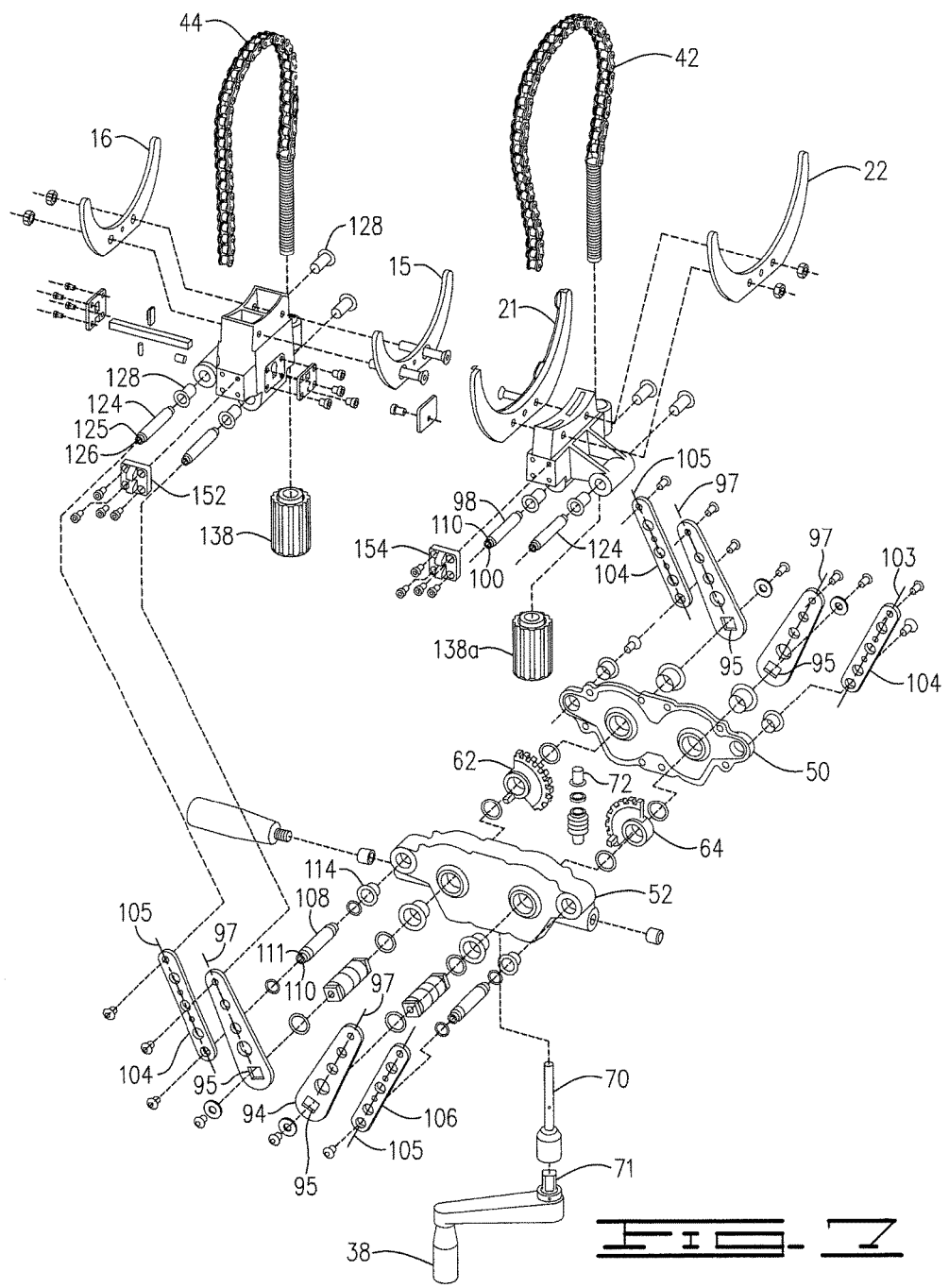

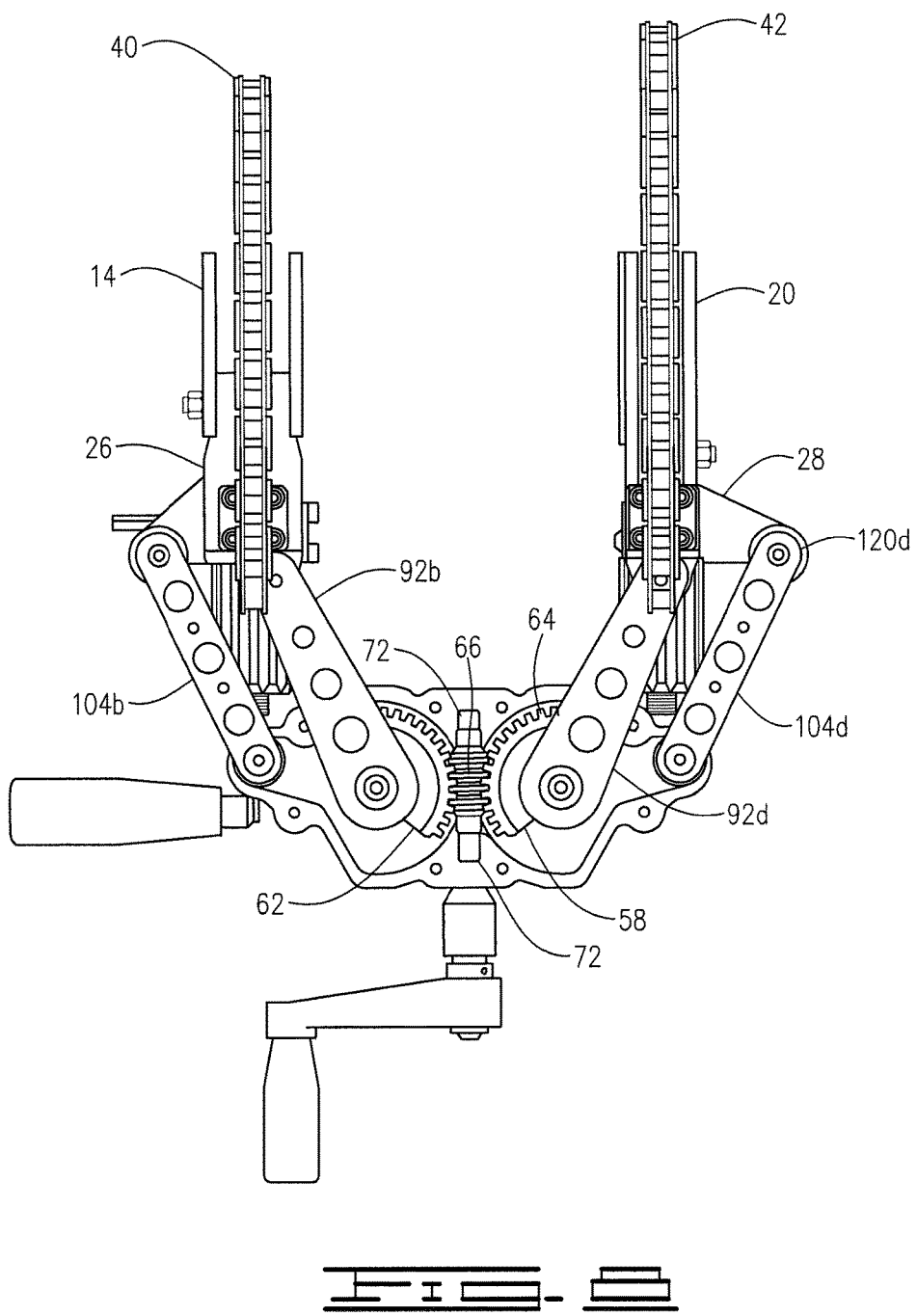

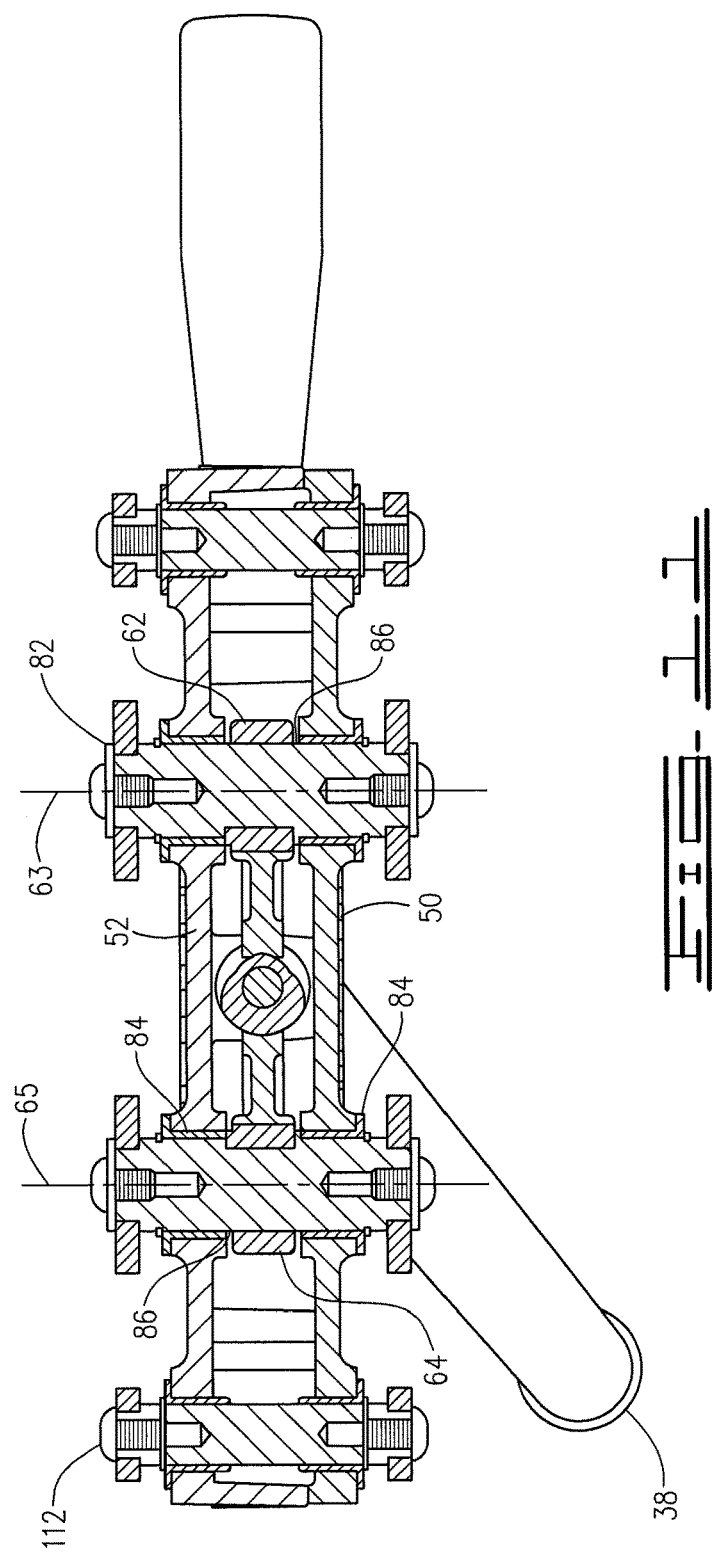

SOCKET FUSION JIG

CROSS REFERENCE TO RELATED APPLICATION

This application claims priority from U.S. Provisional Application 61/680,173 filed Aug. 6, 2012.

BACKGROUND OF THE INVENTION

Heat fusable plastic pipe has been used in industrial, commercial and residential applications for a number of years. Methods of heat fusing plastic pipe include butt fusion, socket fusion and electrofusion. Socket fusion jigs are generally used to fuse pipe after the pipe has been installed. In other words, the socket fusion jig is typically used to fuse a coupling to an already installed pipe. While there are a number of socket fusion jigs on the market right now, there are disadvantages that exist with each. For example, existing jigs are heavy and often have V-shaped jaw clamps that will distort the coupling and pipe during tightening. In addition, those that exist currently do not allow for installation in close quarters because the pipe must be spaced significantly apart so that the jaws can unclamp far enough to clear the entire outer diameter of the pipe to be removed. Other jigs require power drills or impact drivers to operate and thus require an external source of power. Thus, there is a need for a socket fusion jig that can be utilized in close quarters, that will not deform pipe and that can be used in tight spaces.

SUMMARY OF THE INVENTION

A socket fusion jig comprises a coupling saddle for engaging a pipe coupling in a pipe saddle spaced from the coupling saddle for engaging a pipe coupling and a pipe saddle spaced from the coupling saddle for engaging a pipe that is fixed against movement. Manual rotation of a handle with no external source of power other than that required to move the handle by human means will cause the coupling saddle to move linearly or laterally toward the pipe saddle. A first rotation of the handle causes rotation of first and second input links. Simultaneous rotation of the first and second input links will move the coupling saddle laterally relative to the pipe saddle. The coupling saddle has an arcuate or curved surface adapted to engage the surface of a coupling while the pipe saddle has an arcuate pipe saddle surface adapted to engage the pipe. The coupling saddle is connected to a first pivot block and the coupling saddle is connected to a second pivot block. The pipe and coupling saddles preferably are removable and replaceable. As such, coupling saddles with different radius of curvature may be utilized as can pipe saddles with different radius of curvature. As such, the socket fusion jig may be used to connect pipe and couplings over a range of diameters, preferably at least sixty-three millimeters to 125 millimeters. The handle rotates about a longitudinal central axis that is perpendicular to the longitudinal central axis of the pipe and coupling to be joined.

DESCRIPTION OF DRAWINGS

FIG. 5 is a front view with the pipe and coupling joined.

FIG. 6 is a front view with the jig closed, but without the pipe and coupling.

FIG. 7 is an exploded view of the socket fusion jig.

FIG. 10 is a section view through line 10-10 of FIG. 9.

FIG. 11 is a section view through line 11-11 of FIG. 4.

DESCRIPTION OF AN EMBODIMENT

Figure 1:
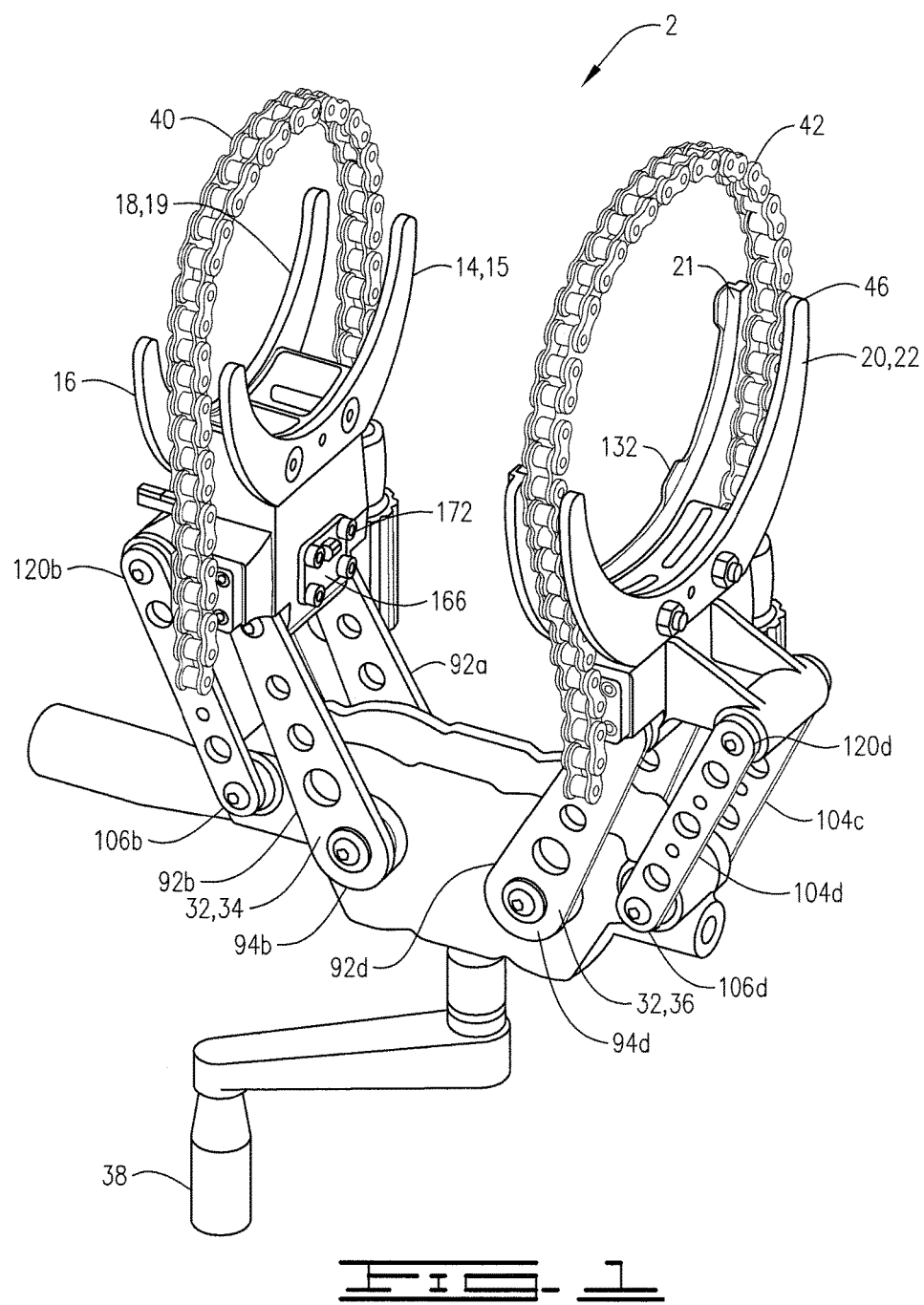
FIG. 1 is a perspective view looking at the back, or rear of a socket fusion jig.

The current disclosure is directed to a socket fusion jig used for mechanically joining heat fusible plastic pipe. The socket fusion jig described herein is a lightweight socket fusion jig that is manually operated and requires no external source of power. The socket fusion jig is adapted to be used in tight spaces in connection with installed pipe that is fixed in place.

Referring now to the drawings, socket fusion jig 2 is used to connect a pipe 4 to a coupling 6. Pipe 4 has longitudinal center line 8, and coupling 6 has longitudinal center line 10. Socket fusion jig 2 comprises a gear box 12, with a gear arrangement disposed therein. The gear arrangement will be described in more detail herein below. Socket fusion jig 2 includes a pipe saddle 14 and a coupling saddle 20. Pipe saddle 14 is a removable and replaceable pipe saddle 14, which comprises a pair of pipe saddle plates 15 and 16 respectively. Pipe saddle plates 15 and 16 have arcuate surfaces 17 and 18 respectively that collectively comprise the curved or arcuate surface 19 of saddle 14. Surfaces 17 and 18 define an arc of less than 180° and preferably define an arc of about 165° such that the ends of the pipe saddle 14 will be positioned below longitudinal center line 8 of a pipe 4 positioned in saddle 14.

Coupling saddle 20 may comprise a pair of coupling saddle plates 21 and 22. Coupling saddle 21 and 22 have arcuate surfaces 23 and 24 which collectively define the curved, or arcuate surface 25 of coupling saddle 20. Surfaces 23 and 24 may define an arc of less than 180° and preferably about 165°, such that the ends 46 thereof are positioned below the axis 10 of coupling 6. Pipe saddle 14 is removably connected to a pivot or jaw block 26 and coupling saddle 20 is removably connected to pivot or jaw block 28. Because pipe saddle 14 and coupling saddle 20 are removable, socket fusion jig 2 is adapted to join pipes to couplings over a range of pipe diameters. Socket fusion jig 2 may be especially useful for joining couplings to pipe ranging from about 63 millimeters to about 125 millimeters, and may be used to join a coupling to pipe outside the ranges mentioned.

A pair of oppositely rotating four bar linkages 32 are utilized to move pipe saddle 14 and coupling saddle 20 laterally relative to one another. Oppositely rotating four bar linkages 32 comprise a first four bar linkage 34 for moving pipe saddle 14 and a second four bar linkage 36 for moving coupling saddle 20. A handle 38 is utilized to operate a gear arrangement housed in gear box 12. The gear arrangement in gear box 12 is preferably a worm gear set which will be described in more detail herein below. Rotation of handle 38 will cause synchronized movement of first and second four bar linkages 34 and 36 respectively. Pipe 4 will be restrained in pipe saddle 14. Pipe 4 is installed pipe, so that pipe saddle 14 when attached to pipe 4 is fixed against movement. Rotation of handle 38 will therefore cause coupling saddle 20, along with coupling 6 therein, to move linearly towards and away from pipe saddle 14 and pipe 4. Longitudinal central axes 8 and 10 will stay in a co-linear relationship as coupling 6 is moved.

A pipe restraint 40 is used to hold pipe 4 in pipe saddle 14. Likewise, a coupling restraint 42 is used to hold coupling 6 in coupling saddle 20. Pipe and coupling restraints 40 and 42 may comprise roller chains which may be for example nickel-plated, lube-free roller chains. Use of a lube-free roller chain prevents chain lubrication from contaminating a fusion joint. Roller chains 40 and 42 are conformable to the shape of pipe 4 and coupling 6 respectively. The combination of pipe saddle 14 and chain 40 will engage the outer surface of pipe 4 over about at least 275° and preferably as much as about 325°. Likewise, the combination of coupling saddle 20 and chain 42 will engage the outer surface of coupling 6 over about at least 275° and preferably as much as about 325°. Because a significant amount of the outer surfaces of the pipe 4 and coupling 6 are engaged during the joining process, deformation, which is a concern with prior art socket fusion jigs, may be prevented.

Surface 25 of coupling saddle 20 is a curved engagement surface with a radius of curvature that matches the radius of curvature of the outer surface of coupling 6. Surface 25 preferably passes through an arc of at least about 165°. Ends 46 of coupling saddle 20 are thus positioned below center line 10 of coupling 6. Surface 19 of pipe saddle 14 is a curved engagement surface, and preferably has a radius of curvature that matches the radius of curvature of the outer diameter of pipe 4. Curved engagement surface 19 has an arc of less than 180°, and in one embodiment has an arc of at least about 165°. Ends 44 of pipe saddle 14 will thus be positioned below the longitudinal central axis 8 of pipe 4. Curved surface 19 mates with the outer surface of pipe 4, and curved surface 25 mates with the outer surface of coupling 6. Roller chain 40 will conform to the shape of pipe 4 around about 130° to 160° of the outer surface of pipe 4. Likewise, roller chain 42 will conform to the outer surface of coupling 6 and will engage approximately 130° to 160° thereof. Curved surfaces 19 and 25 may be serrated surfaces to aid in retaining pipe 4 and coupling 6 therein.

Figure 9:
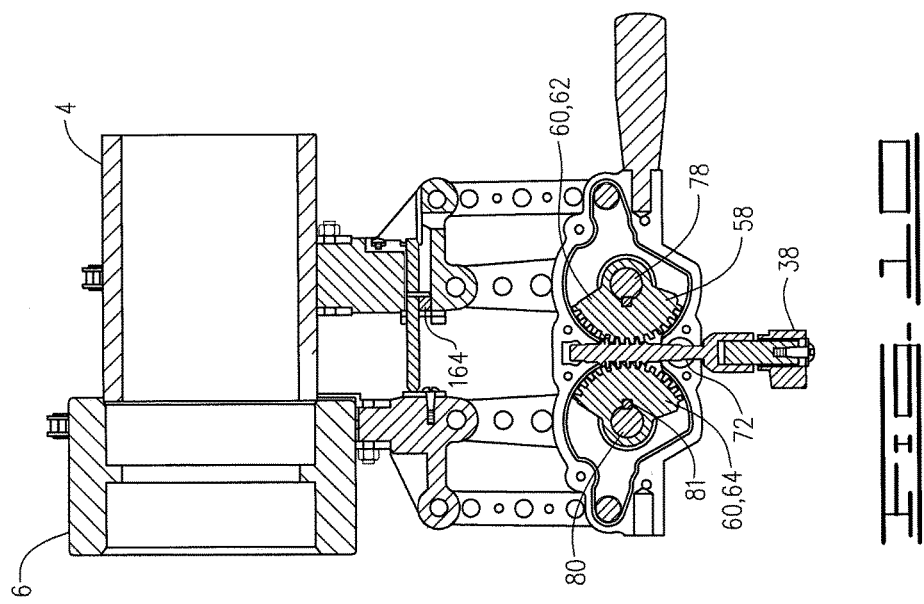
FIG. 9 is a right side view of the socket fusion jig.
Figure 8:
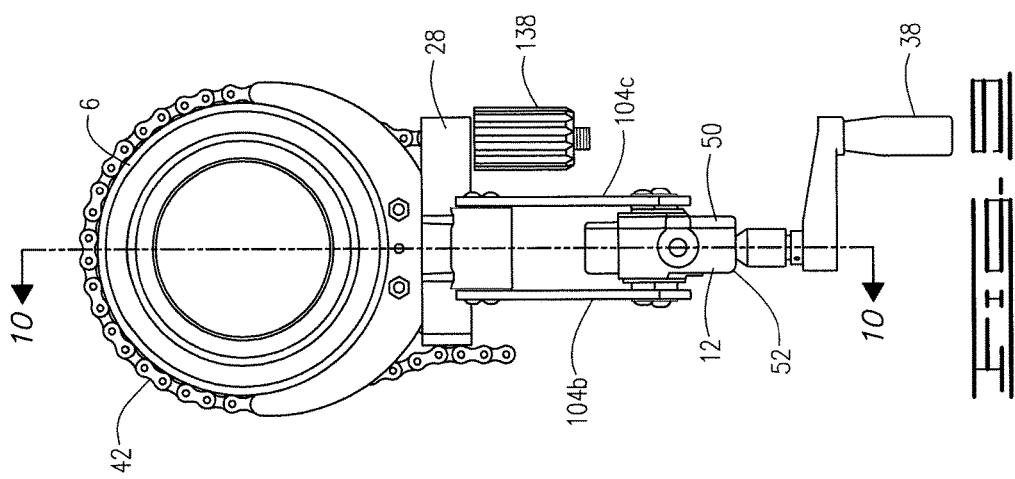
FIG. 8 is a view of the socket fusion jig in the partially open position with the gear box body removed.
Figure 12:
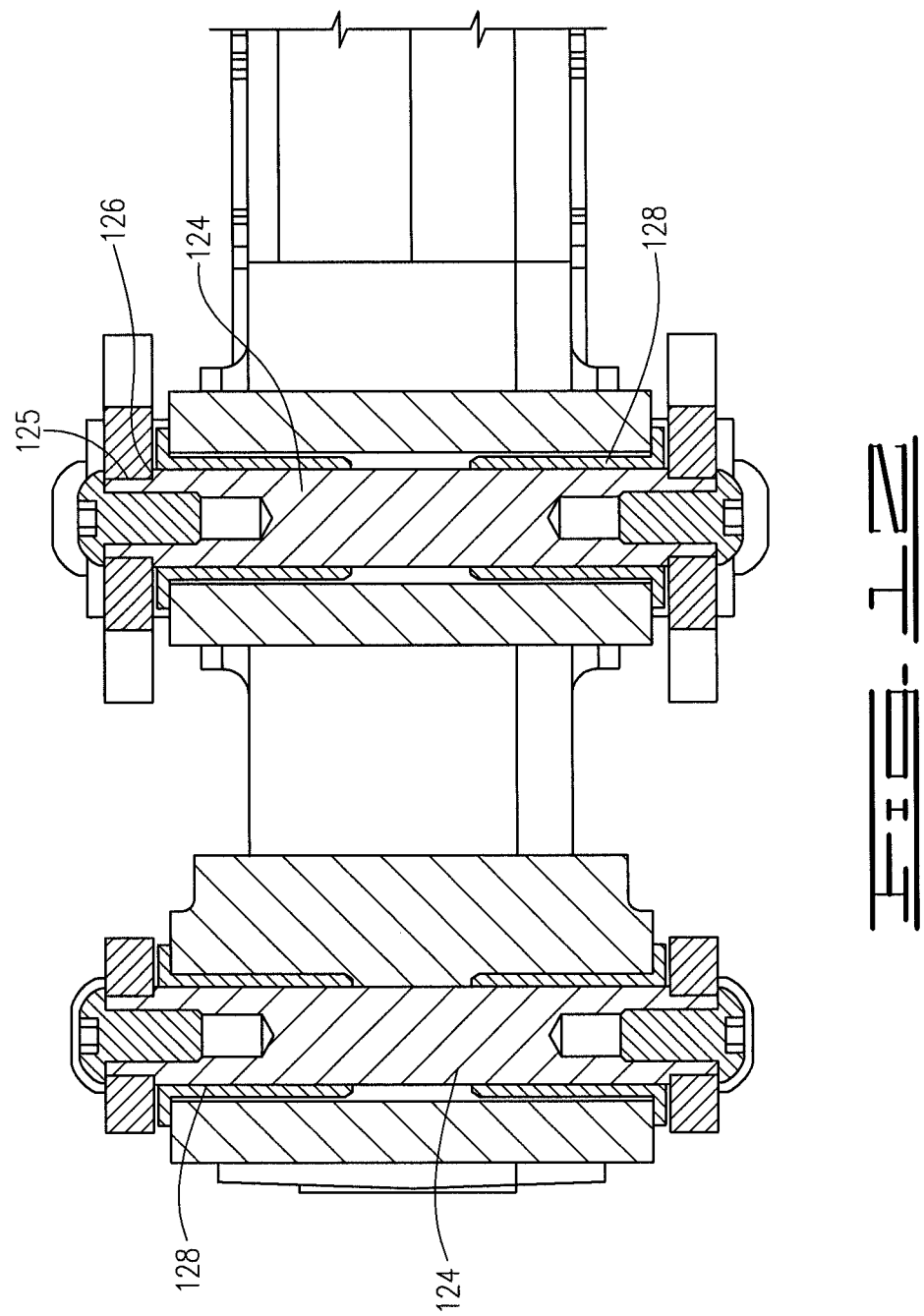
FIG. 12 is a section view through line 12-12 of FIG. 4.

Gear box 12 may comprise a face plate 50 attached to a gear box body 52 with screws, other fasteners, or other means known in the art. FIG. 8 is a view looking at face plate 50 with gear box body 52 removed. FIG. 10 is a cross-section taken through lines 10-10 of FIG. 9. Socket fusion jig 2 includes a worm gear drive 58 which may comprise a pair of worm gears 60. Worm gears 60 may comprise a right or first worm gear 62 which will drive first four bar linkage 34 and a second or left worm gear 64 which will drive second four bar linkage 36. First worm gear 62 rotates about a longitudinal central axis 63 and second worm gear 64 rotates about longitudinal central axis 65. Axes 63 and 65 are parallel and are coplanar. A worm 66 is positioned between first and second worm gears 62 and 64.

Rotation of handle 38 will rotate worm 66 which will rotate worm gear 62 and 64 about their respective longitudinal central axis 63 and 65 in opposite directions. Thus, worm gears 62 and 64 may be referred to as oppositely rotating worm gears 62 and 64. Worm gear drive 58 may be configured to provide a mechanical advantage such that the operator can create a fusion on large pipe sizes, up to at least 125 millimeters in diameter, with minimal effort. For example, worm gears 62 and 64 and worm 66 may be configured such that a mechanical advantage of approximately 40 to 1 may be achieved. In addition, worm drive 58 is designed so that it cannot be back driven by any external pressure, and will hold pipe 4 and coupling 6 in place during the joining operation.

Handle 38 is connected to a shaft 70 in a manner known in the art, and for example may have a square pin 71 connected thereto inserted into a square opening in shaft 70. Shaft 70 has longitudinal central axis 69, and is pinned or otherwise fixed to worm 68 such that rotation of handle 38 will cause rotation of worm 66, in turn causing opposite rotation of worm gears 62 and 64. A pair of shouldered bushings 72 are pressed into gear box body 52 and shaft 70 will rotate therein. Longitudinal central axis 69, about which handle 70 rotates, is perpendicular to axes 8 and 10 of pipe 4 and coupling 6, respectively.

Worm gears 62 and 64 are keyed to shafts 78 and 80 respectively with keys 81. Shafts 78 and 80 have longitudinal central axis 63 and 65 respectively. Shafts 78 and 80 are essentially identical except the location of the key 81 may be different. As such, the details of shafts 78 and 80 will be explained with respect only to shaft 78. The features on shaft 80 will be identified on the drawings with the numbers used for the features on shaft 78. Shafts 78 and 80 have square ends 82 connected to the four bar linkages 34 and 36. Bushings 84 are pressed into gear box plate 50 and gear box body 52, and shafts 78 and 80 rotate therein. Shaft 78 may have retaining rings 86 disposed thereabout to hold key 81 in place.

In the embodiment shown shaft 78 is connected to an input link 92 of four bar linkage 34. Cap screws and flat washers or other fasteners known in the art may be utilized to hold input link 92 to shafts 78 and 80. The details of four bar linkage 34 will be explained and it is understood that the details of four bar linkage 36 are generally identical.

Input link 92 may comprise two separate links designated as 92A and 92B which act a single link 92 in four bar linkage 34. Input link 92 has first end 94 with a square opening 95 therein adapted to receive the ends of shaft 78 so that rotation of shaft 78 will cause the rotation of input link 92 about longitudinal axis 63. Input link 92 has a second end 96 connected to first pivot block 26. Input link 92 has a longitudinal center line 97. A pin 98 extends through first pivot block 26. Pin 98 has reduced diameter portions 100 at both ends thereof, which define shoulders 101. A pair of bushings 102, which may be shouldered bushings 102 are press fit into pivot block 26. A cap screw 103 or other fastener may be used to connect second end 96 of input link 92 to shaft 98. Shaft 98 may rotate relative to input link 92, and shaft 98 may rotate in bushings 102 such that shaft 98 rotates relative to pivot block 26.

Four bar linkage 34 includes a follower link 104 which may be comprised of two separate links 104A and 104B that act as one single follower link 104. Follower link 104 has first end 106. A shaft 108 with reduced diameter portions 110 at each end thereof extend through an opening at or near first end 106 of links 104A and 104B. Reduced diameter portions 110 define shoulder 111. Cap screws 112 are inserted into each end of shaft 108 to press follower link 104 against shoulders 111. Bushings 114, which are oppositely facing shouldered bushings are received about shaft 108 and pressed into gear box plate 50 and gear box body 52. A pair of retaining rings 116 may be utilized to prevent movement of bushings 114 and engage the shoulders on bushings 114.

Shaft 108 rotates in bushings 114. The longitudinal center line 105 of follower link 104 is parallel or is substantially parallel to a longitudinal center line 97 of input link 92.

A pin 124 has reduced diameter portions 125 that define shoulders 126. Reduced diameter portions 125 of pins 124 extend through openings at or near the second ends 120 of follower link 104. A cap screw or other fastener is inserted into shaft 124 to hold link 104 against shoulders 126. A pair of bushings 128 are pressed on or otherwise fixed in pivot block 26 and shaft 108 rotates in bushings 128.

Four bar linkage 34 as described herein comprises input link 92 and follower link 104. The third link is defined by the portions of gear box 12 that extend between first end 106 of follower link 104 and first ends 94 of input link 92. The fourth link comprises the portions of pivot block 26 between upper ends 96 and 120 of input link 92 and follower link 104 respectively.

The identical numbers are utilized on second four bar linkage 36 except that the designations C and D are utilized in place of A and B to allow for ease of identification. It is evident that the operation of four bar linkages 34 and 36 are identical and that first four bar linkage 34 moves pivot block 26 while second four bar linkage 36 moves pivot block 28.

A check plate 132 may be integrally formed with or connected to coupling saddle plate 21 which may be described as inner coupling saddle plate 21. Check plate 132 is used to provide a stop for coupling 6. Coupling 6 when properly positioned during the joining operation with pipe 4 will be pressed against check plate 132.

First pivot block 26 has a lug 134 extending therefrom that may be integrally formed therewith. Lug 134 has an opening 136 therethrough. A knob 138 which may be referred to as an adjustment knob 138 has an internal thread (not shown). A thrust bearing 142 is mounted at an upper end of knob 138. Chain 40 is connected to an upper end 144 of a rod 146 which may be an all thread rod 146. Pivot block 28 likewise has a lug 162. Lug 162 has an opening 150 therein. A second knob 138 which may be referred to as knob 138A for ease of the reference has an internal thread and thrust bearing 142 mounted at an upper end thereof. Chain 42 is connected to an upper end 144 of an all thread rod 146 which may be referred to as an all thread rod 146A for ease of reference.

Pivot block 26 has a pair of teeth, or hooks 152 and pivot block 28 has teeth, or hooks 154. In operation of socket fusion jig 2, chain 40 will be positioned on teeth 152 and chain 42 will be positioned on teeth 154.

An automatic stab depth indicator 156 comprises a depth guide, or depth pin 156 with markings or stab depth indications 158 thereon. Markings 158 are identified with the size of the pipe 4 to be joined to a coupling 6. Pin 154 has a plurality of notches 160 associated with each stab depth indication.

A release pin 162 which may be spring loaded or otherwise biased toward notches 160, hold depth pin 156 in place to automatically set a stab depth. When release pin 162 is raised, a return spring 164 will force pin 156 to retract.

The socket fusion jig 2 as described herein may be used in the process of fusing or joining pipe 4 and coupling 6. Socket fusion jig 2 is generally to be used with a pipe 4 that is installed and fixed against movement. Socket fusion jig 2 is a variable size jig in that it can be used for a range of pipe sizes. As previously explained pipe saddle 14 and coupling saddle 20 are removable. Pipe saddle 14 and coupling saddle 20 are selected so that the radius of curvature of the engagement surfaces 19 and 25 match the radius of the pipe 4 and coupling 6 to be joined. Socket fusion jig 2 may be used with pipe sizes over a wide diameter range, and preferably from about 63 millimeters to at least about 125 millimeters.

Coupling 6 is first attached to socket fusion jig 2 by placing the coupling 6 in saddle 20. Coupling 6 should be pressed against check plate 132 to ensure proper stab depth. Chain 42 is positioned over coupling 6 and will conform to the shape thereof. Chain 42 is attached to the chain hooks or teeth 154 on pivot block 28. Chain 42 is tightened by rotating clamp knob 138A. As explained previously curved surface 25 of saddle 20 is adapted to mate with the outer surface of coupling 6 and therefore engage coupling 6 over approximately 150° to 175° and preferably at least about 165°. Chain 42 will engage the outer surface of coupling 6 over approximately 130° to 160° thereof. Thus, coupling 6 can be securely fixed in saddle 20 and because the engagement of approximately 280° to 340° with coupling 6, socket fusion jig 2 will prevent any deformation of coupling 6. Thus, socket fusion jig is a deformation free socket fusion jig.

The proper stab depth for pipe 4 into coupling 6 may be set by utilizing stab depth pin 158. For example, if a 125 mm pipe is to be joined, pin 158 will have a 125 mm marked notch thereon. Stab depth pin 156 will be pushed inwardly through pivot block toward pivot block 26 toward pivot block 28. The pin will be pushed in until the 125 mm notch is reached, which will be recognized by the 125 mm mark seen on pin 156 as it passes through pivot block 26.

Pin 156 is retained by two guide plates 166 and 168 respectively, one each positioned on the sides of pivot block 26. Pin 156 is pushed into the selected depth which corresponds to a selected marking on pin 158. Once stab depth indicator pin 158 is set, handle 38 is rotated to bring saddles 14 and 20 together. Rotation of handle 38 will move saddle 20 linearly toward saddle 14, so that longitudinal central axis 10 of coupling 6 stays in alignment with longitudinal axis 8 of pipe 4. This insures the proper alignment of pipe 4 and coupling 6 during the joining operation. Jaws 26 and 28 are brought together until stab depth indicator pin 156 touches stop plate 169 on pivot block 28.

Once the proper stab depth has been set, pipe 4 is loaded into saddle 14. Chain 40 is wrapped around pipe 4 and is attached to teeth 152 on pivot block 26. Clamp knob 138 is tightened to retain pipe 4 in saddle 14. Prior to tightening chain 40 over pipe 4, pipe 4 is to be pressed against the coupling with stab depth indicator pin 156 still engaging plate 168. Pipe 4 is then clamped in place.

Figure 2:
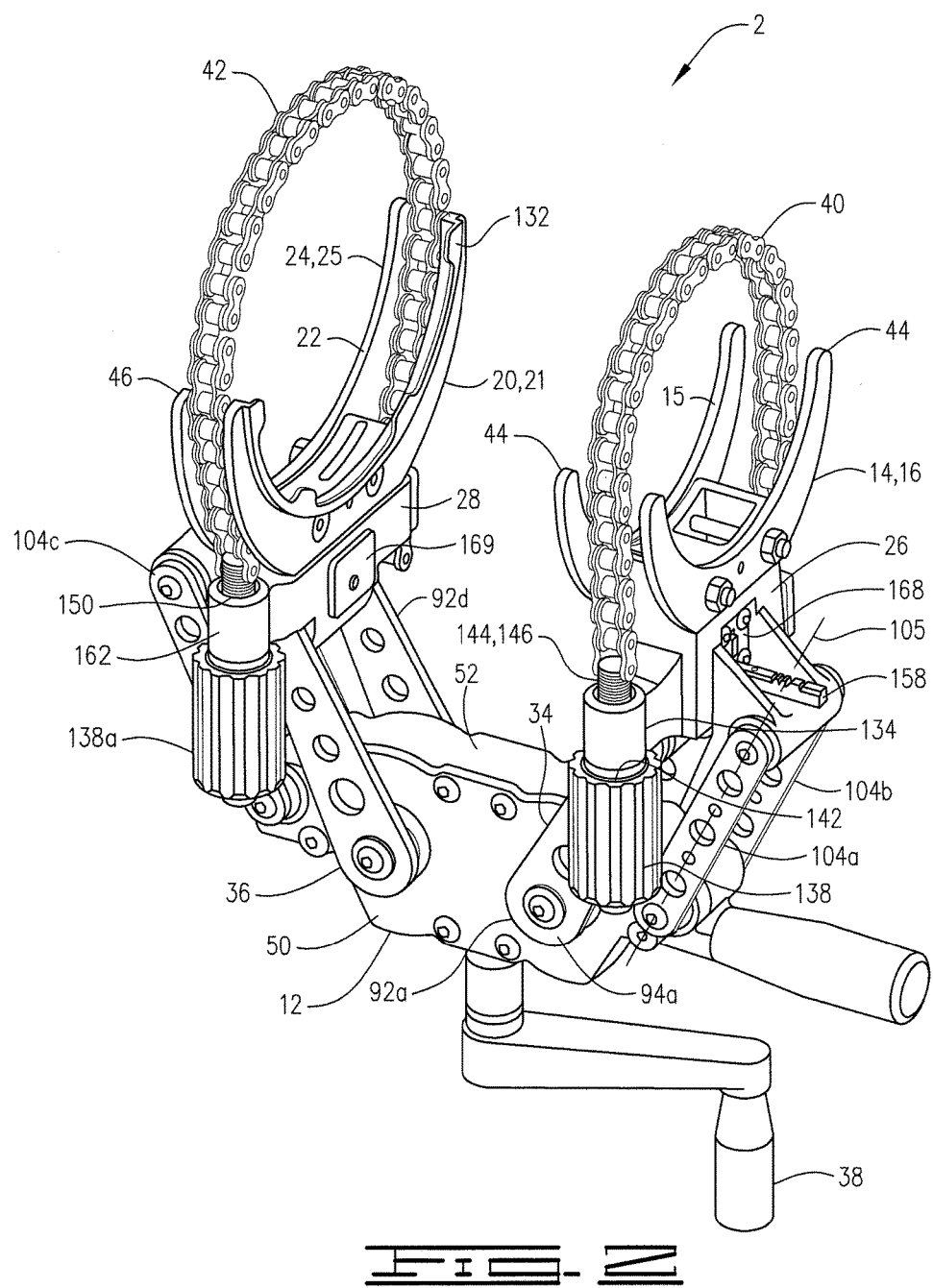
FIG. 2 is a perspective view looking at the front or forward side of the socket fusion jig.
Figure 3:
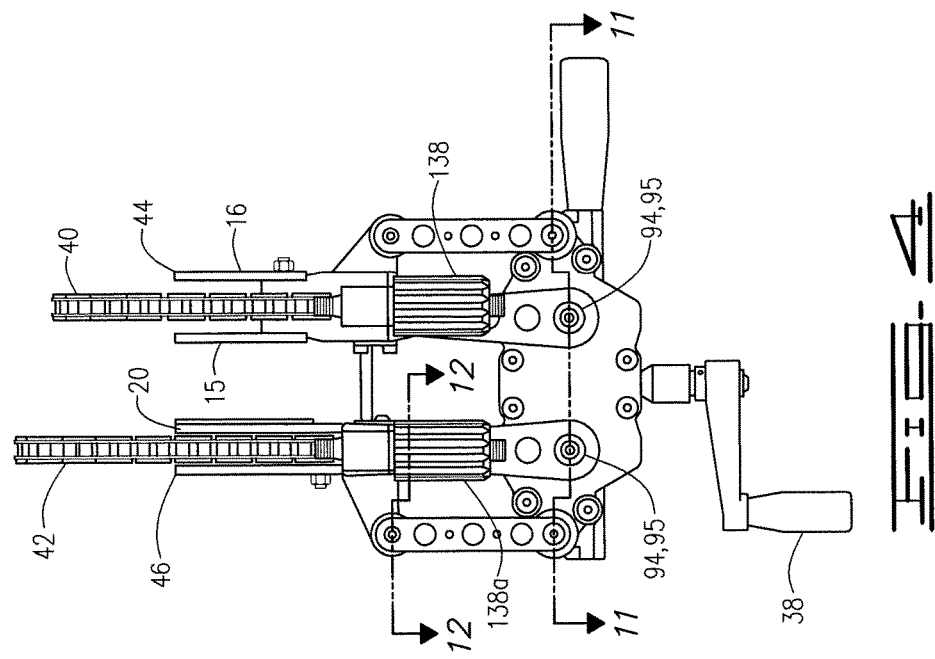
FIG. 3 is a front view of the socket fusion jig with a pipe and coupling mounted therein.
Figure 4:
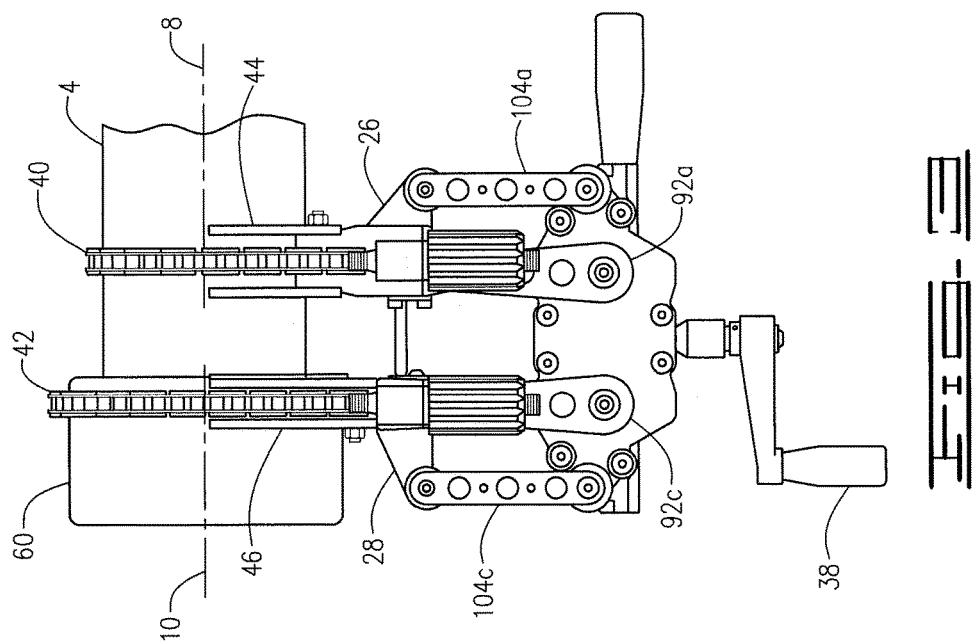
FIG. 4 is a front view of the socket fusion jig with a stab depth indicator extended.
Figure 13:
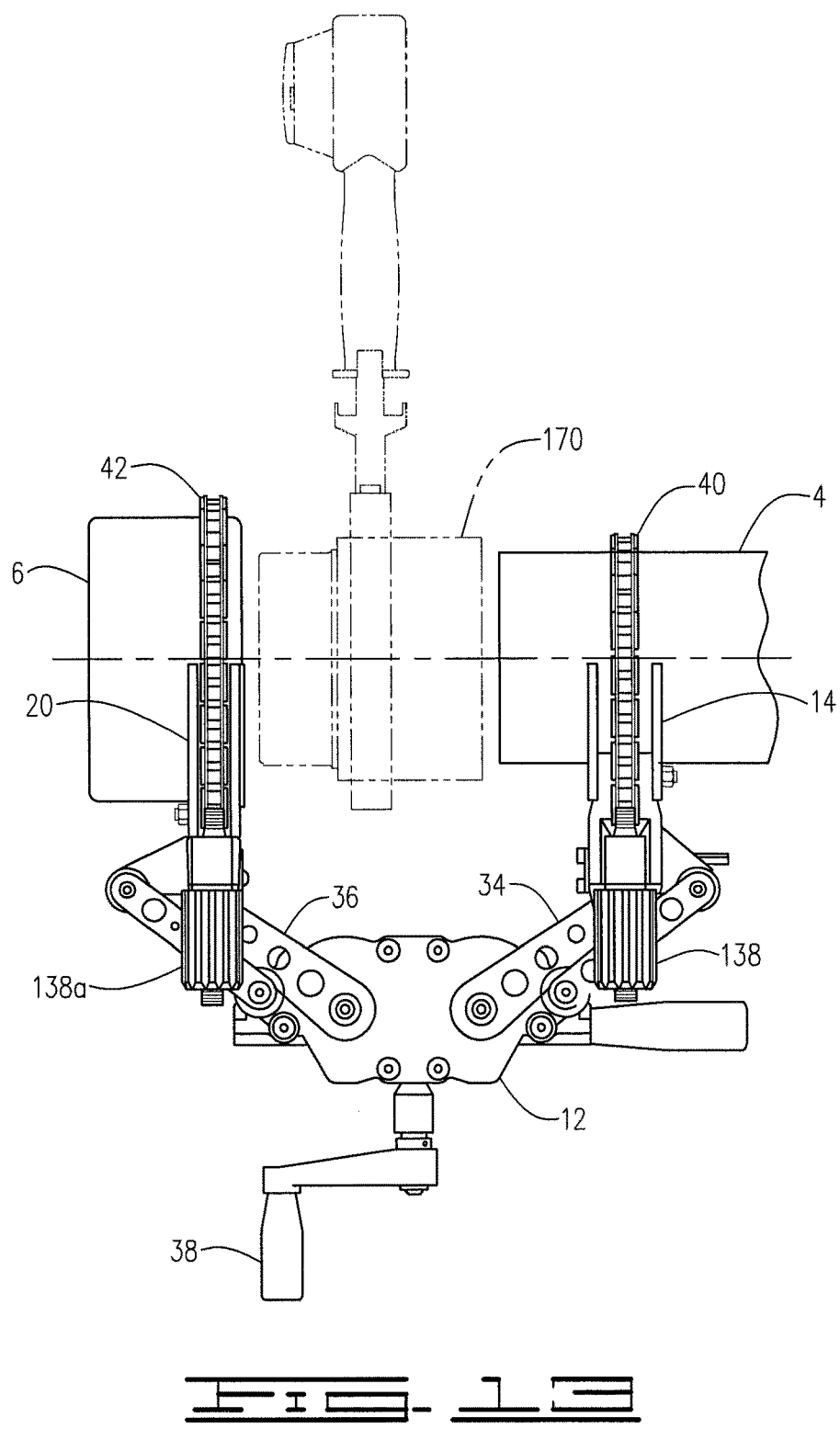
FIG. 13 shows the socket fusion jig with a heater in phantom lines and prepared for insertion.
Figure 14:
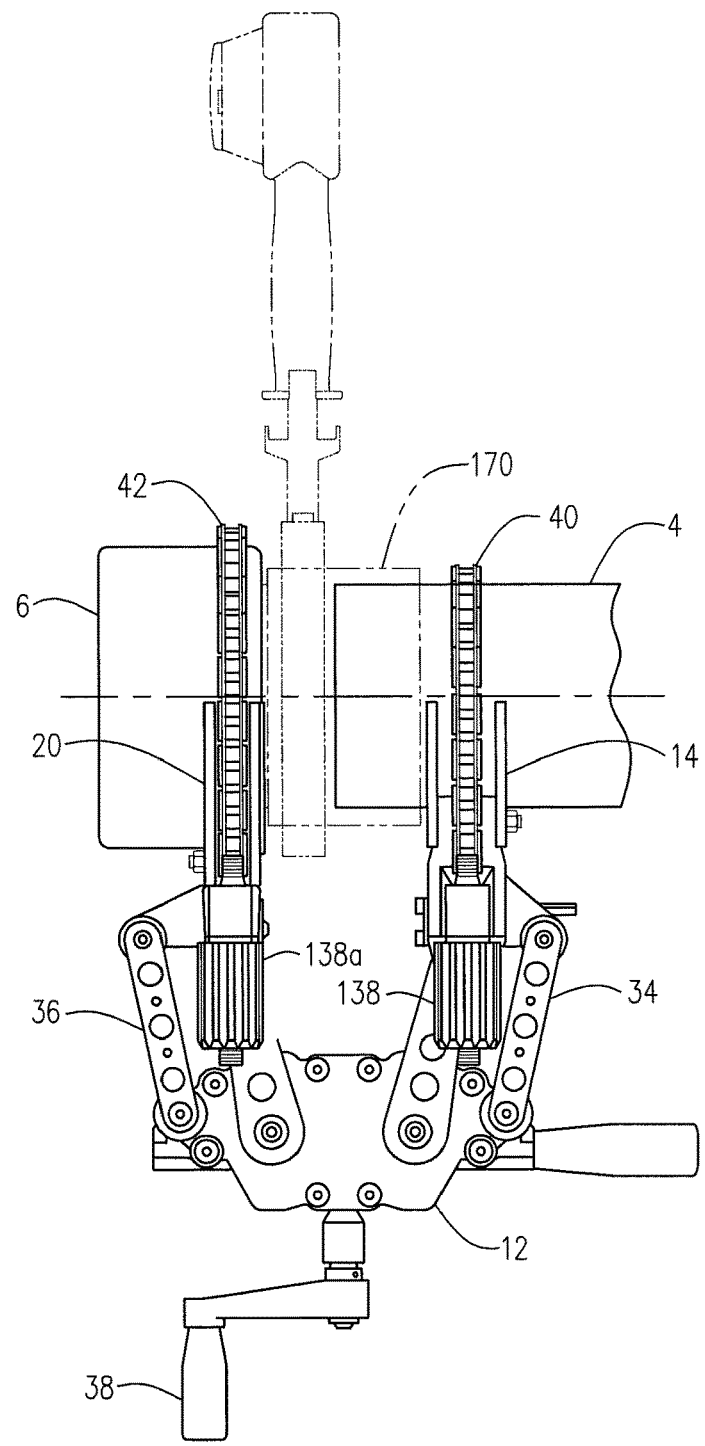
FIG. 14 is a front view with the pipe inserted into the heater.

Once pipe 4 and coupling 6 are both properly clamped in jaw blocks 26 and 28 respectively, handle 38 is rotated so that four bar linkages 34 and 36 move simultaneously. Stab depth pin 156 is released by moving the quick release latch 162 upwardly. Handle 38 is rotated counter-clockwise from the view in FIG. 2 to move jaws to a fully open position. A heater 170, which is shown in dashed lines in FIGS. 13 and 14 is inserted between coupling 6 and pipe 4. Handle 38 is then rotated to bring jaw blocks 26 and 28 together thus bringing saddles 14 and 20 together. Because pipe 4 is fixed against motion, the rotation of handle 38, which causes synchronized movement of four bar linkages 34 and 36 moves saddle 20 and thus coupling 6 linearly directly toward pipe 4. As is apparent from the drawings, the longitudinal central axis 10 of coupling 6 and longitudinal central axis 8 of pipe 4 will stay in fixed co-linear relationship. Handle 38 is rotated so that heater 130 is inserted into coupling 6 and disposed about pipe 4. Heater 170 is allowed to soak for a proper amount of time.

Once pipe 4 and coupling 6 are heated, jaws 26 and 28 are opened quickly and heater 170 is removed. Jaws 26 and 28 are then moved together until stops 172 on pivot block 26 are pressed against stop plate 169 on pivot block 28 to provide proper fusion and stab depth. Pipe 4 and coupling 6 are allowed to cool for a proper amount of time after which the pipe and coupling are unclamped.

As is apparent herein socket fusion jig 15 of the present disclosure can be used in tightly confined spaces. For example, socket fusion jig 2 can be used in a space in which the distance between pipe 4 and a wall, or adjacent pipe is equal to the difference between the coupling radius and pipe radius plus about one-half inch. With socket fusion jigs having a V-block configuration, which is a common prior art configuration as much as an additional two inches may be required because of the size of the V-block. Furthermore, because handle 38 is positioned beneath saddles 14 and 20, ease of installation and operation are greater than that with prior art socket fusion jigs.

What is claimed is:

1. A socket fusion jig comprising:
    a first pivot block with a removable and replaceable pipe saddle connected thereto for engaging a pipe to be joined to a coupling, the first pivot block adapted to receive pipe saddles with different radius of curvature;
    a second pivot block with a removable and replaceable coupling saddle connected thereto for engaging the coupling to be joined to the pipe, the second pivot block adapted to receive coupling saddles with different radius of curvature;
    first and second rotatable input links connected to the first and second pivot blocks respectively;
    a handle operable to cause synchronized rotation of the first and second rotatable input links thereby moving the second pivot block and the coupling saddle linearly toward the first pivot block and the pipe saddle; and
    a stab depth indicator for setting a proper stab depth of the pipe into the coupling, wherein the stab depth indicator extends from the first pivot block and engages the second pivot block to set the proper stab depth.

2. The socket fusion jig of claim 1, wherein the pipe saddle comprises a pair of pipe saddle plates, and the coupling saddle comprises a pair of coupling saddle plates.

3. The socket fusion jig of claim 1, wherein rotation of the handle rotates the first and second input links in opposite directions.

4. The socket fusion jig of claim 1, wherein the axis about which the handle rotates is perpendicular to the longitudinal central axis of the pipe in the pipe saddle.

5. A socket fusion jig for joining a coupling to a fixed pipe comprising:
    pipe saddle for engaging a pipe, the pipe saddle having a curved surface that matches the radius of curvature of the pipe;
    a coupling saddle for engaging a coupling, the coupling saddle having a curved surface that matches the radius of curvature of the coupling;
    first and second oppositely rotating linkages for moving the coupling and pipe laterally relative to each other; and
    first and second oppositely rotating worm gears for rotating the first and second linkages, respectively.

6. The socket fusion jig of claim 5 further comprising a handle connected to a drive gear, wherein rotation of the handle rotates the first and second worm gears in opposite directions and moves the coupling saddle laterally toward the pipe saddle.

7. The socket fusion jig of claim 6, wherein the axis of rotation of the drive gear is perpendicular to the longitudinal central axis of the fixed pipe.

8. The socket fusion jig of claim 5 further comprising a handle rotatable about a longitudinal central axis, the longitudinal central axis of the handle being perpendicular to a longitudinal central axis of the fixed pipe, wherein rotation of the handle moves the coupling saddle laterally relative to the pipe saddle.

\* \* \* \* \*